United States Patent
Sao et al.

(10) Patent No.: US 8,858,696 B2
(45) Date of Patent: Oct. 14, 2014

(54) NONAQUEOUS INK COMPOSITION FOR INK JET RECORDING AND INK JET RECORDING METHOD USING THE SAME

(71) Applicant: Seiko Epson Corporation, Tokyo (JP)

(72) Inventors: Akihito Sao, Matsumoto (JP); Maki Nariai, Shiojiri (JP); Makoto Nagase, Shiojiri (JP); Keiji Iida, Chikuhoku-mura (JP); Tomoki Shinoda, Shiojiri (JP); Kenichiro Kubota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 13/749,871

(22) Filed: Jan. 25, 2013

(65) Prior Publication Data
US 2013/0194362 A1    Aug. 1, 2013

(30) Foreign Application Priority Data

Jan. 27, 2012  (JP) ................................ 2012-015028
Jan. 30, 2012  (JP) ................................ 2012-016391

(51) Int. Cl.
*C09D 11/02*   (2014.01)
*C09D 11/36*   (2014.01)

(52) U.S. Cl.
CPC ..................... *C09D 11/36* (2013.01)
USPC ............ 106/31.43; 106/31.58; 106/31.75; 106/31.86

(58) Field of Classification Search
CPC ............................................. C09D 11/36
USPC ................. 106/31.43, 31.58, 31.75, 31.86
See application file for complete search history.

(56) References Cited

U.S. PATENT DOCUMENTS

| | | |
|---|---|---|
| 2004/0094067 A1 | 5/2004 | Oyanagi et al. |
| 2011/0292114 A1* | 12/2011 | Sao et al. .................. 106/31.58 |
| 2011/0292141 A1 | 12/2011 | Sao et al. |
| 2012/0056929 A1 | 3/2012 | Sao et al. |
| 2012/0249666 A1* | 10/2012 | Maki et al. .................. 106/31.75 |
| 2013/0120492 A1* | 5/2013 | Kubota et al. .................. 347/20 |
| 2013/0286117 A1* | 10/2013 | Sao et al. .................. 106/31.75 |

FOREIGN PATENT DOCUMENTS

| | | |
|---|---|---|
| EP | 2390288 A1 * | 11/2011 |
| JP | 2005-200469 A | 7/2005 |
| JP | 2007/146002 * | 6/2007 |
| JP | 2010/180332 * | 8/2010 |
| JP | 2011-246571 A | 12/2011 |
| JP | 2012-052057 A | 3/2012 |
| WO | 2002-055619 A1 | 7/2002 |

* cited by examiner

*Primary Examiner* — Helene Klemanski
(74) *Attorney, Agent, or Firm* — Nutter McClennen & Fish LLP; John J. Penny, Jr.

(57) ABSTRACT

The nonaqueous ink composition for ink jet recording according to the invention includes a compound represented by the General Formula (1) below; and a compound represented by the General Formula (2A) or the General Formula (2B) below.

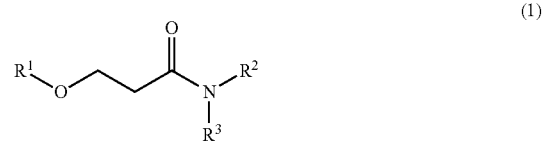

(1)

In the General Formula (1), $R^1$ represents an alkyl group having 1 to 4 carbon atoms, and $R^2$ and $R^3$ represent a methyl group or an ethyl group;

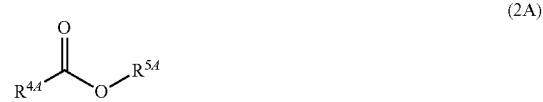

(2A)

in the General Formula (2A), $R^{4A}$ represents an alkyl group having 5 to 9 carbon atoms, and $R^{5A}$ represents a methyl group or an ethyl group;

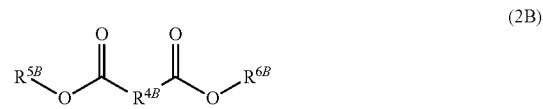

(2B)

in the General Formula (2B), $R^{4B}$ represents an alkylene group having 2 to 5 carbon atoms, and $R^{5B}$ and $R^{6B}$ each independently represent alkyl groups having 1 to 4 carbon atoms.

12 Claims, No Drawings

NONAQUEOUS INK COMPOSITION FOR INK JET RECORDING AND INK JET RECORDING METHOD USING THE SAME

The entire disclosure of Japanese Application No.: 2012-016391 filed on Jan. 30, 2012 and 2012-015028 filed on Jan. 27, 2012 are expressly incorporated by reference herein.

BACKGROUND

1. Technical Field

The present invention relates to a nonaqueous ink composition for ink jet recording and an ink jet recording method using the same.

2. Related Art

An ink jet recording method to record images and characters on a water absorptive recording medium, such as paper, using minute ink droplets which are discharged from a nozzle of an ink jet recording head has been known in the related art. As an ink used in such an ink jet recording method, an aqueous ink which uses water as the main solvent has been widely adopted. However, in recent years, the ink jet recording method has come to be used for recording to various kinds of recording media in various fields. In particular, from the viewpoint of supporting a printing method in which a low absorption recording medium is targeted, instead of an aqueous ink of the related art, a nonaqueous ink which does not substantially contain water as a solvent has been developed.

As the printing method targeting a low absorption recording medium, gravure printing for soft packing material, flexography printing for sanitary products, silk screen printing for metal plates, ink jet printing for indoor and outdoor advertisements, and the like are commonly known. However, it is common that the nonaqueous ink used for these printing methods uses solvents such as toluene, ethyl acetate, methyl ethyl ketone, methyl isobutyl ketone, and cyclohexane which are class-2 organic solvents, handling is difficult due to obligations which arise, such as setting the environmental concentration, installing local exhaust facilities from smells and the like, or performing regular medical examinations, thereby a nonaqueous ink with higher health and safety properties has been desired.

From such a viewpoint, a nonaqueous ink which contains solvents which are not class-2 organic solvents, such as glycol ether acetates such as ethylene glycol monobutyl ether acetate and cyclic esters such as γ-butyrolactone, has been proposed (for example, see JP-A-2005-200469).

However, in the solvent included in a nonaqueous ink such as the above, there are cases in which drying is difficult, and cases in which the solvent has a poor ability to dissolve the front surface of a low absorption recording medium. In a case in which printing to a low absorption recording medium using a nonaqueous ink including such a solvent, since the low absorption recording medium has a poor ability to absorb the solvent, there are cases in which the front surface drying properties of a recorded image are reduced.

In particular, there were cases in which the reduction of the front surface drying properties of the image becomes prominent when printing is performed under high temperature and high humidity conditions (for example, 30° C. or higher, and 70% RH or higher).

SUMMARY

An advantage of some aspects of the invention is to provide a nonaqueous ink composition for ink jet printing in which the front surface drying properties of an image recorded to a low absorption recording medium are excellent, which has excellent health and safety properties, as well as an ink jet recording method which uses the nonaqueous ink composition for ink jet printing.

The invention may be realized as the following forms or application examples.

Application Example 1

According to Application Example 1, there is provided a nonaqueous ink composition for ink jet recording including: a compound represented by the General Formula (1) below; and at least one type of compound represented by the General Formula (2A) or the General Formula (2B) below.

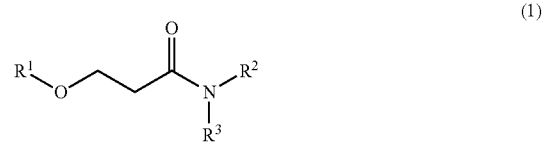

(1)

(In the General Formula (1), $R^2$ represents an alkyl group having 1 to 4 carbon atoms, and $R^2$ and $R^3$ each independently represent a methyl group or an ethyl group.)

(2A)

(In the General Formula (2A), $R^{4A}$ represents an alkyl group having 5 to 9 carbon atoms, and $R^{5A}$ represents a methyl group or an ethyl group.)

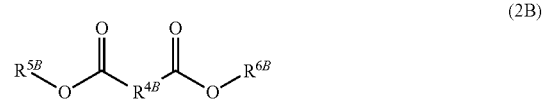

(2B)

(In the General Formula (2B), $R^{4B}$ represents an alkylene group having 2 to 5 carbon atoms, and $R^{5B}$ and $R^{6B}$ each independently represent alkyl groups having 1 to 4 carbon atoms.)

According to the nonaqueous ink composition for ink jet recording of Application Example 1, the front surface drying properties (in particular, the front surface drying properties when recording under high temperature and high humidity) of the image recorded to a low absorption recording medium (in particular, a recording medium which contains a vinyl chloride-based resin on the recording surface) are improved. In addition, since it becomes possible to decrease or not contain a class-2 organic solvent which is used in a nonaqueous ink composition of the related art, this is also excellent from the viewpoint of health and safety properties.

Application Example 2

In the nonaqueous ink composition for ink jet recording according to Application Example 1, in the General Formula (1), $R^1$ may be a methyl group.

Application Example 3

In the nonaqueous ink composition for ink jet recording according to Application Example 1 or Application Example 2, the content of the compound represented by the General Formula (1) [M1 (mass %)] may be from 8 mass % to 48 mass %.

Application Example 4

In the nonaqueous ink composition for ink jet recording according to any one of Application Example 1 to Application Example 3, the content of the compound represented by the General Formula (2A) [M2A (mass %)] may be from 8 mass % to 48 mass %.

Application Example 5

In the nonaqueous ink composition for ink jet recording according to any one of Application Example 1 to Application Example 4, a total (M1+M2A) of the content of the compound represented by the General Formula (1) [M1 (mass %)] and the content of the compound represented by the General Formula (2A) [M2A (mass %)] may be from 16 mass % to 56 mass %.

Application Example 6

In the nonaqueous ink composition for ink jet recording according to any one of Application Example 1 to Application Example 5, a content ratio (M1/M2A) between the content of the compound represented by the General Formula (1) [M1 (mass %)] and the content of the compound represented by the General Formula (2A) [M2A (mass %)] may be from 0.1 to 10.

Application Example 7

In the nonaqueous ink composition for ink jet recording according to any one of Application Example 1 to Application Example 6, the content of the compound represented by the General Formula (2B) [M2B (mass %)] may be from 8 mass % to 48 mass %.

Application Example 8

In the nonaqueous ink composition for ink jet recording according to any one of Application Example 1 to Application Example 7, a total (M1+M2B) of the content of the compound represented by the General Formula (1) [M1 (mass %)] and the content of the compound represented by the General Formula (2B) [M2B (mass %)] may be from 16 mass % to 56 mass %.

Application Example 9

In the nonaqueous ink composition for ink jet recording according to any one of Application Example 1 to Application Example 8, a content ratio (M1/M2B) between the content of the compound represented by the General Formula (1) [M1 (mass %)] and the content of the compound represented by the General Formula (2B) [M2B (mass %)] may be from 0.1 to 10.

Application Example 10

The nonaqueous ink composition for ink jet recording according to any one of Application Example 1 to Application Example 9 may further include an alkylene glycol compound.

Application Example 11

The nonaqueous ink composition for ink jet recording according to any one of Application Example 1 to Application Example 10 may further include a pigment.

Application Example 12

An ink jet recording method is provided including: discharging droplets of the nonaqueous ink composition for ink jet recording according to any one of Application Example 1 to Application Example 11; and recording an image by adhering the droplets to a recording surface containing a vinyl chloride-based resin.

DESCRIPTION OF EXEMPLARY EMBODIMENTS

Below, description will be given of favorable embodiments of the invention. The embodiments described below are for describing examples of the invention. In addition, the invention is not limited by the embodiments below and includes various types of modifications carried out in a range not departing from the gist of the invention.

1. Nonaqueous Ink Composition for Ink Jet Recording

The nonaqueous ink composition for ink jet recording (hereinafter also referred to as simply "nonaqueous ink composition") according to an embodiment of the invention contains the compound represented by the General Formula (1) below and at least one type of the compound represented by the General Formula (2A) or the General Formula (2B) below. The compound represented by the General Formula (1) and the compound represented by the General Formula (2A) and the General Formula (2B) are organic solvents which function as a solvent of the nonaqueous ink.

In an aspect of the invention, the term "nonaqueous ink composition" means that water will not be intentionally added when manufacturing the ink composition, and it is not a concern even if a minute amount of unavoidable moisture during manufacturing or during storage of the ink composition is contained.

Components included in the nonaqueous ink composition according to the present embodiment are described in detail as follows.

1.1. Organic Solvents 1.1.1. Compound Represented by the General Formula (1)

The nonaqueous ink composition according to the present embodiment contains the compound represented by the General Formula (1) below.

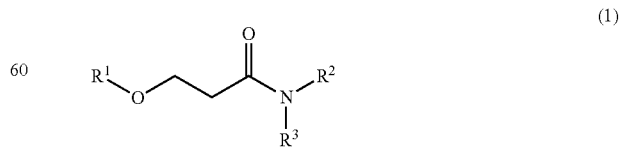

(1)

In the General Formula (1), $R^2$ represents an alkyl group having 1 to 4 carbon atoms, and $R^2$ and $R^3$ each independently represent a methyl group or an ethyl group. The "alkyl group having 1 to 4 carbon atoms" may be a linear or a branched alkyl group, for example, may be a methyl group, an ethyl group, a n-propyl group, an iso-propyl group, a n-butyl group, a sec-butyl group, an iso-butyl group, or a tert-butyl group. As the compound represented by the General Formula (1), one type may be used independently, or two or more types may be mixed and used.

Examples of a function of the compound represented by the General Formula (1) include increasing the front surface drying properties and the fixing properties of the ink adhered to a low absorption recording medium. In particular, the compound represented by the General Formula (1), has an excellent effect of dissolving a vinyl chloride-based resin. Therefore, the compound represented by the General Formula (1) dissolves the recording surface which contains a vinyl chloride-based resin and ink may permeate into the inside of a low absorption recording medium. Due to the ink permeating into the low absorption recording medium in this manner, the ink fixes strongly, and the front surface of the ink dries more easily. Therefore, the obtained image has excellent front surface drying properties and fixing properties.

In particular, the mechanism is unknown, however, the compound represented by the General Formula (1) and the compound represented by the General Formula (2) below interact with one another, and thereby it is possible to significantly increase the front surface drying properties of the ink adhered in a high temperature and high humidity environment.

In the present specification, the term "high temperature and high humidity" refers to a temperature being 30° C. or higher and a humidity being 70% or higher (specifically, in the ranges of 30° C. to 45° C. and 70% RH to 100% RH). In the printing in a high temperature and high humidity environment, there is a tendency for the front surface of the image recorded onto the recording medium to be difficult to dry in comparison with printing in an ordinary environment (for example, a temperature ranging approximately from 20° C. to 25° C. and a humidity ranging from 40% RH to 60% RH).

In addition, in the General Formula (1), it is preferable for $R^1$ to be a methyl group having 1 carbon atom. In the General Formula (1), the standard boiling point of the compound, in which $R^1$ is a methyl group, is low in comparison to the standard boiling point of the compound, in which $R^1$ is an alkyl group having 2 to 4 carbon atoms. Therefore, in the General Formula (1), when the compound in which $R^1$ is a methyl group is used, there are cases in which the front surface drying properties (in particular, the front surface drying properties of an image in a case in which recording is performed in a high temperature and high humidity environment) of the image are further improved.

The HLB value of the compound represented by the General Formula (1) is preferably from 8.0 to 20.0, more preferably from 8.5 to 18.5 and particularly preferably from 12.0 to 18.5. When the HLB value of the compound represented by the General Formula (1) is within the above ranges, it is favorable from the point of interaction with the a vinyl chloride-based resin. Furthermore, the HLB value in the present specification is the value calculated according to the General Formula (3) below from the ratio between the nonpolar value (I) and the organic value (O) (hereinafter, also simply referred to as the "I/O value") in an organic conceptual diagram.

$$\text{HLB value} = (\text{nonpolar value}(I)/\text{organic value}(O)) \times 10 \quad (3)$$

Specifically, the I/O value may be calculated based on the respective documents "Systematic Organic Qualitative Analysis Mixtures", Atsushi Fujita, Kazuma bookstore, 1974, "Theoretical Chemistry of Dyeing", Nobuhiko Kuroki, Maki bookstore, 1966, and "Organic Compound Separation Method", Hiro Inoue, Shokabo Publishing, 1990.

The content [M1 (mass %)] of the compound represented by the General Formula (1), in regard to the total mass of the nonaqueous ink composition, is not particularly limited, however, may be from 5 mass % to 50 mass %, and is preferably from 8 mass % to 48 mass %. Due to the content of the compound represented by the General Formula (1) being within the above ranges, there are cases in which the fixing properties and the front surface drying properties (in particular, the front surface drying properties in a case in which recording is performed in a high temperature and high humidity environment) of the image may be further improved.

1.1.2. Compound Represented by the General Formula (2A)

The nonaqueous ink composition according to the present embodiment contains the compound represented by the General Formula (2A) below. The compound represented by the General Formula (2A) is a type of carboxylate ester.

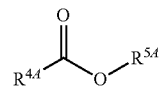

(2A)

In the General Formula (2A), $R^{4A}$ represents an alkyl group having 5 to 9 carbon atoms, and $R^{5A}$ represents a methyl group or an ethyl group. The "alkyl group having 5 to 9 carbon atoms" may be a linear or a branched alkyl group, for example, may be a pentyl group, a hexyl group, a heptyl group, an octyl group, or a nonyl group which is linear or a branched. As the compound represented by the General Formula (2A), one type may be used independently, or two or more types may be mixed and used.

Examples of a function of the compound represented by the General Formula (2A) include increasing the front surface drying properties of the ink adhered to a low absorption recording medium. The compound represented by the General Formula (2A), although not to the extent of the compound represented by the General Formula (1), dissolves the recording surface which contains a vinyl chloride-based resin and ink may permeate into the inside of a low absorption recording medium. Due to the ink permeating into the low absorption recording medium in this manner, it is possible for the front surface of the ink to dry in a short time. Therefore, the obtained image has favorable front surface drying properties.

In addition, the compound represented by the General Formula (2A) and the compound represented by the General Formula (1) interact with one another, and thereby it is possible to significantly increase the front surface drying properties of the ink adhered in a high temperature and high humidity environment.

In the General Formula (2A), when $R^{4A}$ is an alkyl group having 10 or more carbon atoms, there is a tendency for the standard boiling point of the solvent to be excessively high. Therefore, there is a tendency for the surface drying properties of the ink adhered in a high temperature and high humidity environment to decrease. In addition, in the General Formula (2A), when $R^{4A}$ is an alkyl group having 4 or less carbon atoms, there are cases in which handling is difficult due to obligations arising, such as setting the environmental concentration, installing local exhaust facilities from smells and the like, or performing regular medical examinations.

Specific examples of the compound represented by the General Formula (2A) include methyl n-decanoate, ethyl n-decanoate, methyl n-hexanoate, ethyl n-hexanoate, methyl n-heptanoate, ethyl n-heptanoate, methyl n-octanoate, ethyl n-octanoate, methyl n-nonanoate, ethyl n-nonanoate, methyl n-decanoate, ethyl n-decanoate, and methyl 2-hexanoate.

The content [M2A (mass %)] of the compound represented by the General Formula (2A), in regard to the total mass of the nonaqueous ink composition, is not particularly limited, however, may be from 5 mass % to 50 mass %, and is preferably from 8 mass % to 48 mass %. Due to the content of the compound represented by the General Formula (2A) being within the above ranges, there are cases in which the front surface drying properties (in particular, the front surface drying properties in a case in which recording is performed in a high temperature and high humidity environment) of the image may be further improved.

The total (M1+M2A) of the content of the compound represented by the General Formula (1) [M1 (mass %)] and the content of the compound represented by the General Formula (2A) [M2A (mass %)] is preferably from 16 mass % to 56 mass %. Due to the total of the content of both compounds being within the above ranges, it is possible to obtain an image in which the front surface drying properties (in particular, the front surface drying properties in a case in which recording is performed in a high temperature and high humidity environment) are excellent.

In addition, the content ratio (M1/M2A) between the content of the compound represented by the General Formula (1) [M1 (mass %)] and the content of the compound represented by the General Formula (2A) [M2A (mass %)] is preferably from 0.1 to 10, and more preferably from 0.16 to 8. When the content of both compounds is within the above ranges, it is possible to obtain an image in which the front surface drying properties (in particular, the front surface drying properties in a case in which recording is performed in a high temperature and high humidity environment) are excellent.

1.1.3. Compound Represented by the General Formula (2B)

The nonaqueous ink composition according to the present embodiment contains the compound represented by the General Formula (2B) below. The compound represented by the General Formula (2B) is a type of saturated aliphatic dicarboxylate esters of.

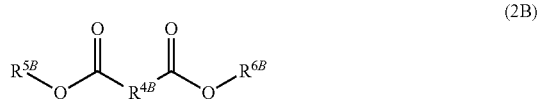

(2B)

In the General Formula (2B), $R^{4B}$ represents an alkylene group having 2 to 5 carbon atoms, and $R^{5B}$ and $R^{6B}$ each independently represent alkyl groups having 1 to 4 carbon atoms. The "alkylene group having 2 to 5 carbon atoms" may be a linear or a branched alkylene group, for example, may be an ethylene group, or an alkylene group having 3 to 5 carbon atoms which is linear or a branched. In addition, the "alkyl group having 1 to 4 carbon atoms" may be a linear or a branched alkyl group, for example, may be a methyl group, an ethyl group, a n-propyl group, an iso-propyl group, a n-butyl group, a sec-butyl group, an iso-butyl group, or a tert-butyl group. As the compound represented by the General Formula (2B), one type may be used independently, or two or more types may be mixed and used.

Examples of a function of the compound represented by the General Formula (2B) include increasing the front surface drying properties of the ink adhered to a low absorption recording medium. The compound represented by the General Formula (2B), although not to the extent of the compound represented by the General Formula (1), dissolves the recording surface which contains a vinyl chloride-based resin and ink may permeate into the inside of a low absorption recording medium. Due to the ink permeating into the low absorption recording medium in this manner, it is possible for the front surface of the ink to dry in a short time. Therefore, the obtained image has favorable front surface drying properties.

In addition, the compound represented by the General Formula (2B) and the compound represented by the General Formula (1) interact with one another, and thereby it is possible to significantly increase the front surface drying properties of the ink adhered in a high temperature and high humidity environment.

In addition, in the General Formula (2B), it is preferable for $R^{4B}$ to be an alkylene group having 4 to 5 carbon atoms. Therefore, it is possible to further increase the surface drying properties of the ink adhered in a high temperature and high humidity environment.

Meanwhile, in the General Formula (2B), when $R^{4B}$ is an alkylene group having 6 or more carbon atoms, there is a tendency for the standard boiling point of the solvent to be excessively high. Therefore, there is a tendency for the surface drying properties of the ink adhered in a high temperature and high humidity environment to decrease. In addition, in the General Formula (2B), when $R^{4B}$ is an alkylene group having 3 or less carbon atoms, there are cases in which handling is difficult due to obligations arising, such as setting the environmental concentration, installing local exhaust facilities from smells and the like, or performing regular medical examinations.

Specific examples of the compound represented by the General Formula (2B) include dimethyl succinate, diethyl succinate, diisobutyl succinate, dimethyl glutarate, diethyl glutarate, diisobutyl glutarate, dimethyl adipate, diethyl adipate, diisobutyl adipate, dimethyl pimelate, diethyl pimelate, diisobutyl pimelate, dimethyl 2-ethylglutarate, diethyl 2-ethylglutarate, and diisobutyl 2-ethylglutarate.

The content [M2B (mass %)] of the compound represented by the General Formula (2B), in regard to the total mass of the nonaqueous ink composition, is not particularly limited, however, may be from 5 mass % to 50 mass %, and is preferably from 8 mass % to 48 mass %. Due to the content of the compound represented by the General Formula (2B) being within the above ranges, there are cases in which the front surface drying properties (in particular, the front surface drying properties in a case in which recording is performed in a high temperature and high humidity environment) of the image may be further improved.

The total (M1+M2B) of the content of the compound represented by the General Formula (1) [M1 (mass %)] and the content of the compound represented by the General Formula (2B) [M2B (mass %)] is preferably from 16 mass % to 56 mass %. Due to the total of the content of both compounds being within the above range, it is possible to obtain an image in which the front surface drying properties (in particular, the front surface drying properties in a case in which recording is performed in a high temperature and high humidity environment) are excellent.

In addition, the content ratio (M1/M2B) between the content of the compound represented by the General Formula (1) [M1 (mass %)] and the content of the compound represented by the General Formula (2B) [M2B (mass %)] is preferably from 0.1 to 10, and more preferably from 0.16 to 8. When the content of both compounds is within the above ranges, it is possible to obtain an image in which the front surface drying properties (in particular, the front surface drying properties in a case in which recording is performed in a high temperature and high humidity environment) are excellent.

1.2. Other Components

The nonaqueous ink composition according to the present embodiment may also contain an organic solvent other than the organic solvents described above, surfactants, pigments, dispersants, and the like as necessary.

1.2.1. Other Organic Solvents

It is preferable for the nonaqueous ink composition according to the present embodiment to contain a liquid alkylene glycol compound at a normal temperature and a normal pressure from the viewpoint of strongly fixing ink to a vinyl chloride-based resin.

As the alkylene glycol compound, an ethylene glycol compound or a propylene glycol compound such as those disclosed in International Publication No. WO2002/055619A is preferable.

In a case where an alkylene glycol compound is contained in the nonaqueous ink composition according to the present embodiment, the alkylene glycol compound may be suitably selected according to the printing characteristics, however, the content thereof in regard to the total mass of the nonaqueous ink composition is preferably from 20 mass % to 80 mass %, and more preferably from 30 mass % to 75 mass %.

Examples of a preferable ethylene glycol compound include monoethers or diethers of ethylene glycol, diethylene glycol, triethylene glycol, tetraethylene glycol or polyethylene glycol, and a diethylene glycol compound is preferable. In addition, examples of a preferable propylene glycol compound include monoethers or diethers of propylene glycol, dipropylene glycol, tripropylene glycol or polypropylene glycol, and a dipropylene glycol is preferable. Furthermore, among the ethylene glycol compounds, ethylene glycol monomethyl ether, ethylene glycol monoethyl ether, ethylene glycol monoethyl ether acetate and ethylene glycol monobutyl ether are classified as class-2 organic solvents, therefore from the viewpoint of reducing the difficulty of handling and the burden on the environment and the like, it is preferable not to use these.

As the diethylene glycol compound, for example, the diethylene glycol compound represented by the General Formula (4) below may be used.

$$R^6—(OC_2H_4)_2—O—R^7 \quad (4)$$

In the General Formula (4), $R^6$ and $R^7$ are independently hydrogen atoms, alkyl groups having 1 to 4 carbon atoms, or $R^8CO$ groups, respectively. $R^8$ is an alkyl group having 1 to 4 carbon atoms. The "alkyl group having from 1 to 4 carbon atoms" may be a linear or a branched alkyl group, for example, may be a methyl group, an ethyl group, a n-propyl group, an iso-propyl group, a n-butyl group, a sec-butyl group, or a tert-butyl group. Specific examples of a diethylene glycol compound represented by the General Formula (4) include diethylene glycol, diethylene glycol monomethyl ether, diethylene glycol dimethyl ether, diethylene glycol methyl ethyl ether, diethylene glycol monoethyl ether, diethylene glycol diethyl ether, diethylene glycol mono n-butyl ether, diethylene glycol di n-butyl ether, diethylene glycol butyl methyl ether, diethylene glycol monoethyl ether acetate, diethylene glycol mono n-butyl ether acetate, and the like.

For example, as the dipropylene glycol compound, a dipropylene glycol compound represented by the General Formula (5) below may be used.

$$R^9—(OC_3H_6)_2—R^{10} \quad (5)$$

In the General Formula (5), $R^9$ and $R^{10}$ are independently hydrogen atoms, alkyl groups having 1 to 4 carbon atoms, or $R^{11}CO$ groups, respectively. $R^{11}$ is an alkyl group having 1 to 4 carbon atoms. The "alkyl group having from 1 to 4 carbon atoms" may be a linear or a branched alkyl group, for example, may be a methyl group, an ethyl group, a n-propyl group, an iso-propyl group, a n-butyl group, a sec-butyl group, or a tert-butyl group. Examples of the dipropylene glycol compound represented by the General Formula (5) include, for example, dipropylene glycol, dipropylene glycol monomethyl ether, dipropylene glycol monoethyl ether, and the like.

The diethylene glycol compound and the dipropylene glycol compound which may be used in the nonaqueous ink composition according to the present embodiment, preferably have a boiling point at normal pressure of 150° C. or more, more preferably of 180° C. or more, respectively.

In addition, the diethylene glycol compound and the dipropylene glycol compound which may be used in the nonaqueous ink composition according to the present embodiment preferably have a vapor pressure at 20° C. of 1 hPa or less, and more preferably of 0.7 hPa or less.

By using the diethylene glycol compound and the dipropylene glycol compound described above which satisfy the conditions of a high boiling point and a low vapor pressure, the burden of providing localized exhaust facilities or exhaust gas treatment facilities is reduced, improving the working environment becomes possible, and it is also possible to reduce the environmental burden to the surrounding environment.

The nonaqueous ink composition according to the present embodiment, in addition to the previously disclosed diethylene glycol compound, the dipropylene glycol compound, or combinations thereof, may also contain a polyalkylene glycol compound which is liquid at a normal temperature and a normal pressure, and is represented by the General Formula (6).

$$R^{13}—(OR^{12})_n—O—R^{14} \quad (6)$$

In the General Formula (6), $R^{12}$ is an alkylene group having 2 to 3 carbon atoms. $R^{13}$ and $R^{14}$ are each independently hydrogen atoms, or alkyl groups having 1 to 6 carbon atoms (preferably alkyl groups having 1 to 4 carbon atoms). n is an integer of from 3 to 6. Examples of the alkylene group having 2 to 3 carbon atoms include, for example, ethylene groups and propylene groups. The "alkyl group having 1 to 6 carbon atoms" may be a linear or a branched alkyl group, for example, in addition to the "alkyl group having 1 to 4 carbon atoms", may be a linear or a branched pentyl group or hexyl group.

The polyalkylene glycol compounds which may be used in the nonaqueous ink composition according to the present embodiment preferably have a boiling point at a normal pressure of 200° C. or more, more preferably 250° C. or more. In addition, the flash point thereof is preferably 100° C. or more, and more preferably 130° C. or more. By using such a polyalkylene glycol compound, volatilization suppression may be provided to the nonaqueous ink composition. For example, sedimentation of the solid content in the tube may be prevented or reduced by suppressing volatilization of the nonaqueous ink composition in a tube which transports the nonaqueous ink composition to the ink jet recording head from the ink cartridge.

Examples of a preferable polyalkylene glycol compound include, for example, a polyalkylene glycol monoalkyl ether, a polyalkylene glycol dialkyl ether, or the like. For the compounds, one type thereof may be used independently, and two or more types may also be mixed and used.

Examples of the polyalkylene glycol monoalkyl ether include, for example, triethylene glycol monomethyl ether, triethylene glycol monobutyl ether, tripropylene glycol monobutyl ether, the polyethylene glycol monobutyl ether where n is from 4 to 6 in the General Formula (6), tetraethylene glycol monomethyl ether, pentaethylene glycol monomethyl ether, hexaethylene glycol monomethyl ether, and the like.

An example of the polyalkylene glycol dialkyl ether includes tetraethylene glycol dimethyl ether.

In addition, the nonaqueous ink composition according to the present embodiment may further contain, other than the previously exemplified organic solvents, the organic solvent exemplified below.

Examples of the other organic solvent, preferably a polar organic solvent, include for example, alcohols (for example, ethyl alcohol, 1-propanol, fluoroalcohol, and the like), ethers (for example, diethyl ether, dipropyl ether, and the like) and the like.

Furthermore, from a viewpoint of the ease of use and a reduction of the environmental burden and the like, it is preferable that the nonaqueous ink composition according to the present embodiment does not contain a class-2 organic solvent (refer to annexed 6-2 of the Industrial Safety and Health Law Enforcement Ordinance).

1.2.2. Surfactant

In the nonaqueous ink composition according to the present embodiment, other than the above organic solvents, from a viewpoint of decreasing the surface tension and improving the wettability with the recording medium, a silicon-based surfactant, a fluorine-based surfactant, or a polyoxyethylene derivative which is a non-ionic surfactant may also be added.

As the silicon-based surfactant, it is preferable to use a polyester modified silicon or a polyether modified silicon. Specific examples of a silicon-based surfactant include BYK-347, 348, BYK-UV3500, 3510, 3530, and 3570 (all manufactured by BYK Japan KK).

As the fluorine-based surfactant, it is preferable to use a fluorine modified polymer, and a specific example thereof includes BYK-340 (manufactured by BYK Japan KK).

In addition, as the polyoxyethylene derivative, it is preferable to use an acetylene glycol-based surfactant. Specific examples include Surfynol 82, 104, 465, 485, and TG (all manufactured by Air Products and Chemicals Japan Inc.), Olefin STG, and E1010 (all manufactured by Nissin Chemical Industry Co., Ltd.), Nonion A-10R, and A-13P (all manufactured by NOF Corporation), Flowlen TG-740W, and D-90 (manufactured by Kyoeisha Chemistry Co., Ltd.), Noigen CX-100 (manufactured by Dai-ichi Kogyo Seiyaku Co., Ltd.) and the like.

The content of the surfactant in the nonaqueous ink composition according to the present embodiment is preferably from 0.05 mass % to 3 mass %, and more preferably from 0.5 mass % to 2 mass %.

1.2.3. Pigments

In the nonaqueous ink composition according to the present embodiment, as the colorant material, a pigment of a colored inorganic pigment, a colored organic pigment, or the like which is generally used in the nonaqueous ink composition of the related art may be used. For the pigments, one type thereof may be used independently, and two or more types may also be mixed and used.

Examples of the pigment include, for example, azo pigments such as azo lake, insoluble azo pigments, condensed azo pigments, and chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye type lakes, and acid dye type lakes; organic pigments such as nitro pigments, nitroso pigments, aniline black, and daylight fluorescent pigments; inorganic pigments such as carbon black, and the like. The average primary particle diameter of a pigment particle is not particularly limited, however, it is preferably from 50 nm to 500 nm.

Examples of the pigment in a case in which the nonaqueous ink composition according to the present embodiment is a magenta or a red ink, include for example, C.I. pigment red 2, C.I. pigment red 3, C.I. pigment red 5, C.I. pigment red 6, C.I. pigment red 7, C.I. pigment red 15, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 149, C.I. pigment red 166, C.I. pigment red 170, C.I. pigment red 177, C.I. pigment red 178, C.I. pigment red 194, C.I. pigment red 209, C.I. pigment red 222, C.I. pigment red 224, and the like.

Examples of the pigment in a case where the nonaqueous ink composition according to the present embodiment is an orange or a yellow ink, for example, C.I. pigment orange 31, C.I. pigment orange 43, C.I. pigment orange 64, C.I. pigment yellow 12, C.I. pigment yellow 13, C.I. pigment yellow 14, C.I. pigment yellow 15, C.I. pigment yellow 17, C.I. pigment yellow 74, C.I. pigment yellow 93, C.I. pigment yellow 94, C.I. pigment yellow 128, C.I. pigment yellow 138, C.I. pigment yellow 150, C.I. pigment yellow 180, and the like.

Examples of the pigment in a case where the nonaqueous ink composition according to the present embodiment is a green or a cyan ink, include for example, C.I. pigment blue 15, C.I. pigment blue 15:2, C.I. pigment blue 15:3, C.I. pigment blue 16, C.I. pigment blue 60, C.I. pigment green 7, C.I. pigment green 36, and the like.

Examples of the pigment in a case where the nonaqueous ink composition according to the present embodiment is a black ink, include for example, carbon black and the like.

Examples of the pigment in a case where the nonaqueous ink composition according to the present embodiment is a white ink, include for example, Pigment White 6, 18, 21, and the like.

The content of the pigment in the nonaqueous ink composition according to the present embodiment may be appropriately selected according to the application and the printing characteristics, however, it is preferably from 0.5 mass % to 25 mass %, more preferably from 0.5 mass % to 15 mass %, and particularly preferably from 1 mass % to 10 mass %.

In the nonaqueous ink composition according to the present embodiment, from a viewpoint of improving the dispersion stability of the pigment, an arbitrary dispersant used in an ordinary nonaqueous ink composition may be used. As the dispersant, it is preferable to use a dispersant which acts effectively when the dissolution parameter of the organic solvent is from 8 to 11. Specific examples of such a dispersant include polyester-based polymer compounds such as Hinoact KF1-M, T-6000, T-7000, T-8000, T-8350P, and T-8000E (all manufactured by Takefu Fine Chemical Co., Ltd.), Solsperse 20000, 24000, 32000, 32500, 33500, 34000, 35200, and 37500 (all manufactured by the LUBRIZOL Corporation), Disperbyk-161, 162, 163, 164, 166, 180, 190, 191, and 192 (all manufactured by BYK Japan KK), Flowlen DOPA-17, 22, 33, and G-700 (all manufactured by Kyoeisha Chemistry Co., Ltd.), Ajisper PB821, and PB711 (all manufactured by Ajinomoto Fine-Techno Co., Inc.), LP4010, LP4050, LP4055, POLYMER 400, 401, 402, 403, 450, 451, and 453 (all manufactured by EFKA CHEMICALS B.V.).

In the nonaqueous ink composition according to the present embodiment, the content of the dispersant may be appropriately selected according to the pigment to be dispersed, however, in regard to a content of 100 parts of the pigment in the nonaqueous ink composition, it is preferably from 5 parts to 200 parts, and more preferably from 30 parts to 120 parts.

1.2.4. Other Components

In the nonaqueous ink composition according to the present embodiment, other additives contained in a normal nonaqueous ink composition may be further added. Examples of the other additives include, for example, stabilizers such as an antioxidant or an ultraviolet absorbent, or binder resins and the like.

Examples of the antioxidant include, for example, BHA (2,3-butyl-4-oxyanisole), BHT (2,6-di-t-butyl-p-cresol), and the like.

Examples of the ultraviolet ray absorber include, for example, a benzophenone-based compound, a benzotriazole-based compound, and the like.

In the nonaqueous ink composition according to the present embodiment, a binder resin may also be added in order to adjust the viscosity of the ink. Examples of the binder resin include, for example, fiber-based resins such as acrylic resins, styrene acrylic resins, rosin modified resins, phenol resins, terpene-based resins, polyester resins, polyamide resins, epoxy resins, vinyl chloride vinyl acetate copolymer resins, and cellulose acetate butyrates; vinyl toluene-α-methyl styrene copolymer resins, and the like. For the binder resins, one type thereof may be used independently, and two or more types may also be mixed and used. Furthermore, the binder resin, according to the addition amount thereof, may make the fixing properties of the ink to the vinyl chloride-based resin more favorable.

1.3. Manufacturing Method of Nonaqueous Ink Composition

The nonaqueous ink composition according to the present embodiment may be manufactured using a well-known method. When a pigment is used as the colorant material, first, after mixing a pigment, a dispersant and an organic solvent (partial), the pigment dispersion liquid is prepared using a ball mill, a bead mill, supersonic waves, or a jet mill and the like, and the nonaqueous ink composition is adjusted so as to have the desired ink characteristics. Subsequently, the nonaqueous ink composition may be obtained by adding the organic solvent (residual quantity) and the other additives (for example, a surfactant or a binder resin) during stirring.

1.4. Physical Properties

In the nonaqueous ink composition according to the present embodiment, from a viewpoint of the recording quality and the reliability and balance as an ink composition for an ink jet, the surface tension at 20° C. is preferably from 20 mN/m to 50 mN/m, and more preferably from 25 mN/m to 40 mN/m. Furthermore, the measurement of the surface tension may be measured by verifying the surface tension when the platinum plate becomes wet with the ink in an environment of 20° C. by using a Full Automatic Surface Tensiometer CBVP-Z (manufactured by Kyowa Interface Science Co., Ltd.).

In addition, from a similar viewpoint, the viscosity at 20° C. of the nonaqueous ink composition according to the present embodiment is preferably from 2 mPa·s to 15 mPa·s, and more preferably from 2 mPa·s to 10 mPa·s. Furthermore, the measurement of the viscosity may be measured by raising the Shear Rate from 10 to 1000 and reading the viscosity when the Shear Rate is at 200 in an environment of 20° C. by using a Viscoelasticity Testing Machine M2BR-300 (manufactured by Pysica Co., Ltd).

2. Ink Jet Recording Method

The ink jet recording method according to the present embodiment is characterized in that it discharges droplets of the previously described nonaqueous ink composition and the droplets are adhered to a low absorption recording medium to record an image.

In the present specification, the term "low absorption recording medium" refers to a recording medium in which the water absorption amount in the Bristow method from the beginning of contact to 30 msec½ is 10 mL/m$^2$ or less, and the recording surface should at least have this property. According to this definition, the "low absorption recording medium" in the invention also includes a non-absorption recording medium which does not absorb water at all. The Bristow method is the method in most widespread use as a measuring method of liquid absorption amount in a short time, and is also adopted by the Japan Technical Association of the Pulp and Paper Industry (JAPAN TAPPI). The details of the test method are disclosed in the standard No. 51 "Paper and Cardboard—Liquid Absorbency Test Method—Bristow Method" of the "JAPAN TAPPI Paper and Pulp Test Method 2000 Edition".

Examples of the low absorption recording medium include, specifically, sheets, a film, textile products, and the like containing a low absorption material. In addition, the low absorption recording medium may also have a layer containing a low absorption material (hereinafter also referred to as the "low absorption layer") provided on the front surface of the substrate (for example, paper, fiber, leather, plastic, glass, ceramics, metal, and the like). In examples of the low absorption material, there are no particular limitations, however, olefin-based resins, ester-based resins, urethane-based resins, acrylic-based resins, vinyl chloride-based resins, and the like may be included.

Among these, as the low absorption recording medium, a low absorption recording medium having a recording surface which contains a vinyl chloride-based resin may be preferably used. Specific examples of the vinyl chloride-based resin include polyvinyl chloride, vinyl chloride-ethylene copolymers, vinyl chloride-vinyl acetate copolymers, vinyl chloride-vinylether copolymers, vinyl chloride-vinylidene chloride copolymers, vinyl chloride-maleate (ester) copolymers, vinyl chloride-(meth)acrylate copolymers, vinyl chloride-(meth)acrylate (ester) copolymers, vinyl chloride-urethane copolymers, and the like. Furthermore, the various characteristics such as the thickness, shape, color, softening temperature, and the hardness of the low absorption recording medium are not particularly limited.

The nonaqueous ink composition described above includes a compound represented by the General Formula (1) and at least one type of compound represented by the General Formula (2A) or the General Formula (2B). Both of the compounds, as described above, have an effect of dissolving a vinyl chloride-based resin. Therefore, the ink jet recording method according to the present embodiment may record an image having further excellent fixability and front surface drying properties (in particular, the front surface drying properties of an image in a case in which recording is performed in a high temperature and high humidity environment) by adhering droplets of the previously described nonaqueous ink composition to a recording surface containing a vinyl chloride-based resin.

The ink jet recording apparatus used in the ink jet recording method according to the present embodiment, there are no particular limitations, however, a drop-on-demand ink jet recording apparatus is preferable. The drop-on-demand ink jet recording apparatus may adopt a piezoelectric device recording method which performs recording by using piezoelectric devices arranged on the recording head, or may adopt a heat jet recording method which performs recording by using heat energy according to a heater or the like of a heating resistance element arranged on the recording head, or the like, and may adopt any recording method. In addition, the nonaqueous ink composition according to the present embodiment may be used favorably, for example, in an ink jet recording method which discharges from an ink jet recording head having a discharge nozzle surface on which an ink-repelling treatment has been performed, because the nonaqueous ink composition has a merit of being inert in relation to the discharge nozzle surface on which an ink-repelling treatment has been performed.

3. Examples

Hereinafter, specific description will be further given of an aspect of the invention using examples and comparative examples; however, the present embodiment is not limited to these examples.

3.1 Composition of Organic Solvent 3.1.1 Compound Represented by Following the General Formula (7)

19.828 g of N,N-dimethyl acrylamide and 6.408 g of methanol were put into a 300 ml separable flask provided with a stirring apparatus, a thermocouple, and a nitrogen gas introduction pipe, and were stirred while introducing nitrogen gas. Next, 0.338 g of sodium t-butoxide was added, and the reaction was performed for 4 hours at 35° C. After the heating was completed, 150 mg of phosphoric acid was added, and after homogenizing the solution, it was left unattended for three hours. The solution was filtered, precipitate was removed, and the non-reactant was further removed by using an evaporator. In this manner, the compound (hereinafter also referred to as "organic solvent A") represented by the General Formula (7) below was obtained.

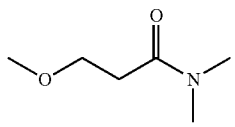

(7)

Furthermore, the HLB value calculated according to the General Formula (3) from the I/O values in the organic conceptual diagram of the obtained organic solvent A was 18.3.

3.1.2 Compound Represented by Following the General Formula (8)

19.828 g of N,N-dimethyl acrylamide and 14.824 g of 1-butanol were put into a 300 ml separable flask provided with a stirring apparatus, a thermocouple, and a nitrogen gas introduction pipe, and were stirred while introducing nitrogen gas. Next, 0.338 g of sodium t-butoxide was added, and the reaction was performed for 4 hours at 35° C. After the heating was completed, 150 mg of phosphoric acid was added, and after homogenizing the solution, it was left unattended for three hours. The solution was filtered, precipitate was removed, and the non-reactant was further removed by using an evaporator. In this manner, the compound (hereinafter also referred to as "organic solvent B") represented by the General Formula (8) below was obtained.

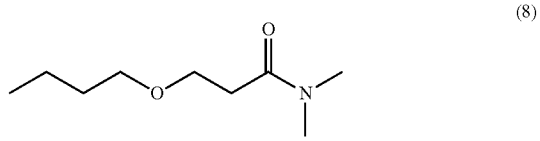

(8)

Furthermore, the HLB value calculated according to the General Formula (3) from the I/O values in the organic conceptual diagram of the obtained organic solvent B was 12.2.

3.2 Preparation of Nonaqueous Ink Composition

An amount of the organic solvent which corresponds to the concentration disclosed in Tables 1 to 2 for each ink was put into the respective containers, this was mixed and stirred for 30 minutes using a magnetic stirrer, and a mixed solvent was obtained.

Part of the obtained mixed solvent was separated, a predetermined amount of Solsperse 37500 (manufactured by the LUBRIZOL Corporation, product name), and C.I. pigment black 7 (manufactured by Mitsubishi Chemical Co., Ltd., product name "CARBON BLACK #970") was added, and milling processing was performed using a homogenizer. Subsequently, a pigment dispersion liquid (average particle diameter of pigment: 150 nm) was obtained by performing dispersion processing using a bead mill filled with zirconia beads of 0.3 mm in diameter.

The black ink composition described in Tables 1 to 4 was obtained by adding the remnant of the organic solvent, BYK-340 (a fluorine-based surfactant, manufactured by BYK Japan KK), and Paraloid B60 (an acrylic resin, manufactured by Rohm and Haas Company) to the obtained pigment dispersion liquid, further mixing and stirring for 1 hour, and filtering this using a membrane filter of 5 μm manufactured by PTFE. Furthermore, the numerical values in the Tables represent mass %.

Furthermore, the materials which were used in the tables are as follows:

C.I. pigment black 7 (black pigment manufactured by Mitsubishi Chemical Co., Ltd., product name "CARBON BLACK #970")

Solsperse 37500 (dispersant manufactured by Lubrizol Co., Ltd., product name)

γ-butyrolactone (organic solvent manufactured by Kanto Chemical. co., Inc.)

methyl n-hexanoate (organic solvent manufactured by Kanto Chemical. co., Inc.)

methyl 2-ethylhexanoate (organic solvent manufactured by Lion Corporation)

methyl n-decanoate (organic solvent manufactured by Lion Corporation)

ethyl n-decanoate (organic solvent manufactured by Kanto Chemical. co., Inc.)

methyl dodecanoate (organic solvent manufactured by Lion Corporation)

dimethyl adipate (organic solvent manufactured by Kanto Chemical. co., Inc.)

diisobutyl adipate (organic solvent manufactured by Rhodia)

dimethyl glutarate (organic solvent manufactured by Kanto Chemical. co., Inc.)

diisobutyl glutarate (organic solvent manufactured by Rhodia)

dimethyl succinate (organic solvent manufactured by Kanto Chemical. co., Inc.)

diisobutyl succinate (organic solvent manufactured by Rhodia)

dimethyl 2-ethylglutarate (organic solvent manufactured by Rhodia)
dimethyl maleate (organic solvent manufactured by Kanto Chemical. co., Inc.)
dimethyl suberate (organic solvent manufactured by Kanto Chemical. co., Inc.)
diethylene glycol diethyl ether (organic solvent manufactured by Nippon Nyukazai Co, Ltd.)
diethylene glycol ethyl methyl ether (product name "Hisolve EDM", an organic solvent, manufactured by Toho Chemical Industry Co., Ltd.)
BYK-340 (a fluorine-based surfactant, manufactured by BYK Japan KK, product name)
Paraloid B60 (acrylic resin manufactured by Rohm and Haas)

3.3. Evaluation Test
3.3.1. Front Surface Drying Properties Test

Using the "SP-300V" printer manufactured by Roland DG Corporation, each ink composition obtained in "3.2 Preparation of Nonaqueous Ink Composition" was printed onto a glossy polyvinyl chloride sheet ("SV-G-1270G", manufactured by Roland DG Corporation) at conditions of a 100% duty, after which, the printed product was dried for 5 minutes. Subsequently, scratching was observed on the glossy surface after the glossy polyvinyl chloride sheet was wound using the winding apparatus. In the observation of the scratching, the proportion of the area with scratching was calculated by measuring the surface roughness using a shape measurement laser microscope ("VK-8700 Generation II", manufactured by Keyence Corporation).

The printing was performed in environments of (condition 1) temperature 22° C., humidity 40% RH, and (condition 2) temperature 35° C., humidity 80% RH, respectively.

Furthermore, the evaluation standard is as follows. The evaluation results will be shown in the Tables 1 to 4.

6: Area with traces of scratching is 0%
5: Area with traces of scratching is more than 0% and less than 10%
4: Area with traces of scratching is from 10% to less than 20%
3: Area with traces of scratching is from 20% to less than 30%
2: Area with traces of scratching is from 30% to less than 40%
1: Area with traces of scratching is 40% or more

TABLE 1

|  | Material | Example 1A | Example 2A | Example 3A | Example 4A | Example 5A | Example 6A | Example 7A |
|---|---|---|---|---|---|---|---|---|
| Pigment | C.I. Pigment Black 7 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 |
| Organic Solvent | Organic Solvent A | | 8.00 | 48.00 | 8.00 | 10.00 | 10.00 | 10.00 |
| | Organic Solvent B | 10.00 | | | | | | |
| | γ-butyrolactone | | | | | | | |
| | methyl n-hexanoate | 10.00 | 8.00 | | | | | 10.00 |
| | methyl 2-ethylhexanoate | | | 8.00 | 48.00 | | | |
| | methyl n-decanoate | | | | | 10.00 | | |
| | ethyl n-decanoate | | | | | | 10.00 | |
| | methyl dodecanoate | | | | | | | |
| | diethylene glycol diethyl ether | 36.00 | 40.00 | | | 36.00 | 36.00 | 36.00 |
| | diethylene glycol ethyl methyl ether | 30.00 | 30.00 | 30.00 | 30.00 | 30.00 | 30.00 | 30.00 |
| Surfactant | BYK-340 | 2.00 | 2.00 | 2.00 | 2.00 | 2.00 | 2.00 | 2.00 |
| Binder Resin | Paraloid B60 | 4.00 | 4.00 | 4.00 | 4.00 | 4.00 | 4.00 | 4.00 |
| Total Amount (mass %) | | 100.00 | 100.00 | 100.00 | 100.00 | 100.00 | 100.00 | 100.00 |
| Evaluation Result | Front Surface Drying Properties (condition 1: 20° C. · 40% RH) | 6 | 6 | 6 | 6 | 6 | 6 | 6 |
| | Front Surface Drying Properties (condition 2: 35° C. · 80% RH) | 5 | 5 | 5 | 5 | 5 | 5 | 6 |

TABLE 2

|  | Material | Comparative Example 1A | Comparative Example 2A | Comparative Example 3A | Comparative Example 4A | Comparative Example 5A | Comparative Example 6A | Comparative Example 7A |
|---|---|---|---|---|---|---|---|---|
| Pigment | C.I. Pigment Black 7 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 |
| Organic Solvent | Organic Solvent A | 10.00 | | | | | 10.00 | |
| | Organic Solvent B | | 10.00 | | | | | |
| | γ-butyrolactone | | | 10.00 | | | | 10.00 |
| | methyl n-hexanoate | | | | 10.00 | | | 10.00 |
| | methyl 2-ethylhexanoate | | | | | | | |
| | methyl n-decanoate | | | | | | | |
| | ethyl n-decanoate | | | | | | | |
| | methyl dodecanoate | | | | | 10.00 | 10.00 | |
| | diethylene glycol diethyl ether | 46.00 | 46.00 | 46.00 | 46.00 | 46.00 | 36.00 | 36.00 |
| | diethylene glycol ethyl methyl ether | 30.00 | 30.00 | 30.00 | 30.00 | 30.00 | 30.00 | 30.00 |

TABLE 2-continued

|  | Material | Comparative Example 1A | Comparative Example 2A | Comparative Example 3A | Comparative Example 4A | Comparative Example 5A | Comparative Example 6A | Comparative Example 7A |
|---|---|---|---|---|---|---|---|---|
| Surfactant | BYK-340 | 2.00 | 2.00 | 2.00 | 2.00 | 2.00 | 2.00 | 2.00 |
| Binder Resin | Paraloid B60 | 4.00 | 4.00 | 4.00 | 4.00 | 4.00 | 4.00 | 4.00 |
| Total Amount (mass %) |  | 100.00 | 100.00 | 100.00 | 100.00 | 100.00 | 100.00 | 100.00 |
| Evaluation Result | Front Surface Drying Properties (condition 1: 20° C. · 40% RH) | 6 | 6 | 6 | 6 | 6 | 6 | 6 |
|  | Front Surface Drying Properties (condition 2: 35° C. · 80% RH) | 2 | 2 | 2 | 2 | 2 | 4 | 3 |

TABLE 3

|  | Material | Example 1B | Example 2B | Example 3B | Example 4B | Example 5B | Example 6B | Example 7B | Example 8B | Example 9B |
|---|---|---|---|---|---|---|---|---|---|---|
| Pigment | C.I. Pigment Black 7 | 4.00 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 | 4.00 |
| Organic Solvent | Organic Solvent A |  | 8.00 | 48.00 | 8.00 | 10.00 | 10.00 | 10.00 | 10.00 | 10.00 |
|  | Organic Solvent B | 10.00 |  |  |  |  |  |  |  |  |
|  | γ-butyrolactone |  |  |  |  |  |  |  |  |  |
|  | dimethyl adipate | 10.00 | 8.00 |  |  |  |  |  |  |  |
|  | diisobutyl adipate |  |  |  |  |  | 10.00 |  |  |  |
|  | dimethyl glutarate |  |  | 8.00 | 48.00 |  |  |  |  |  |
|  | diisobutyl glutarate |  |  |  |  |  |  | 10.00 |  |  |
|  | dimethyl succinate |  |  |  |  | 10.00 |  |  |  |  |
|  | diisobutyl succinate |  |  |  |  |  |  |  | 10.00 |  |
|  | dimethyl 2-ethylglutarate |  |  |  |  |  |  |  |  | 10.00 |
|  | dimethyl maleate |  |  |  |  |  |  |  |  |  |
|  | dimethyl suberate |  |  |  |  |  |  |  |  |  |
|  | diethylene glycol diethyl ether | 36.00 | 40.00 |  | 36.00 | 36.00 | 36.00 | 36.00 | 36.00 |  |
|  | diethylene glycol ethyl methyl ether | 30.00 | 30.00 | 30.00 | 30.00 | 30.00 | 30.00 | 30.00 | 30.00 | 30.00 |
| Surfactant | BYK-340 | 2.00 | 2.00 | 2.00 | 2.00 | 2.00 | 2.00 | 2.00 | 2.00 | 2.00 |
| Binder Resin | Paraloid B60 | 4.00 | 4.00 | 4.00 | 4.00 | 4.00 | 4.00 | 4.00 | 4.00 | 4.00 |
| Total Amount (mass %) |  | 100.00 | 100.00 | 100.00 | 100.00 | 100.00 | 100.00 | 100.00 | 100.00 | 100.00 |
| Evaluation Result | Front Surface Drying Properties (condition 1: 20° C. · 40%RH) | 6 | 6 | 6 | 6 | 6 | 6 | 6 | 6 | 6 |
|  | Front Surface Drying Properties (condition 2: 35° C. · 80%RH) | 5 | 5 | 5 | 5 | 5 | 6 | 5 | 5 | 6 |

TABLE 4

|  | Material | Comparative Example 1B | Comparative Example 2B | Comparative Example 3B | Comparative Example 4B | Comparative Example 5B | Comparative Example 6B | Comparative Example 7B | Comparative Example 8B |
|---|---|---|---|---|---|---|---|---|---|
| Pigment | C.I. Pigment Black 7 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 |
| Organic Solvent | Organic Solvent A | 10.00 |  |  |  |  |  | 10.00 |  |
|  | Organic Solvent B |  | 10.00 |  |  |  |  |  |  |
|  | γ-butyrolactone |  |  | 10.00 |  |  |  |  | 10.00 |
|  | dimethyl adipate |  |  |  |  |  |  |  | 10.00 |
|  | diisobutyl adipate |  |  |  |  |  |  |  |  |
|  | dimethyl glutarate |  |  |  |  |  |  |  |  |
|  | diisobutyl glutarate |  |  |  |  |  |  |  |  |
|  | dimethyl succinate |  |  |  |  |  |  |  |  |
|  | diisobutyl succinate |  |  |  |  |  |  |  |  |

TABLE 4-continued

| | Material | Comparative Example 1B | Comparative Example 2B | Comparative Example 3B | Comparative Example 4B | Comparative Example 5B | Comparative Example 6B | Comparative Example 7B | Comparative Example 8B |
|---|---|---|---|---|---|---|---|---|---|
| | dimethyl 2-ethylglutarate | | | | 10.00 | | | | |
| | dimethyl maleate | | | | | 10.00 | | | |
| | dimethyl suberate | | | | | | 10.00 | 10.00 | |
| | diethylene glycol diethyl ether | 46.00 | 46.00 | 46.00 | 46.00 | 46.00 | 46.00 | 36.00 | 36.00 |
| | diethylene glycol ethyl methyl ether | 30.00 | 30.00 | 30.00 | 30.00 | 30.00 | 30.00 | 30.00 | 30.00 |
| Surfactant | BYK-340 | 2.00 | 2.00 | 2.00 | 2.00 | 2.00 | 2.00 | 2.00 | 2.00 |
| Binder Resin | Paraloid B60 | 4.00 | 4.00 | 4.00 | 4.00 | 4.00 | 4.00 | 4.00 | 4.00 |
| Total Amount (mass %) | | 100.00 | 100.00 | 100.00 | 100.00 | 100.00 | 100.00 | 100.00 | 100.00 |
| Evaluation Result | Front Surface Drying Properties (condition 1: 20° C. · 40% RH) | 6 | 6 | 6 | 6 | 6 | 6 | 6 | 6 |
| | Front Surface Drying Properties (condition 2: 35° C. · 80% RH) | 2 | 2 | 2 | 2 | 2 | 2 | 4 | 3 |

3.3.2. Evaluation Result

According to Example 1A to Example 7A, it was shown that by using the compound represented by the General Formula (1) and the compound represented by the General Formula (2A) together in the organic solvent, the front surface drying properties (in particular, the front surface drying properties in a case in which recording is performed in a high temperature and high humidity environment) were excellent.

According to Example 1B to Example 9B, it was shown that by using the compound represented by the General Formula (1) and the compound represented by the General Formula (2B) together in the organic solvent, the front surface drying properties (in particular, the front surface drying properties in a case in which recording is performed in a high temperature and high humidity environment) were excellent.

According to Comparative Example 1A to Comparative Example 7A, it was shown that, since the compound represented by the General Formula (1) and the compound represented by the General Formula (2A) were not used together in the organic solvent, the front surface drying properties (condition (2)) in a case in which recording was performed in a high temperature and high humidity environment had a tendency to drop.

According to Comparative Example 1B to Comparative Example 8B, it was shown that, since the compound represented by the General Formula (1) and the compound represented by the General Formula (2B) were not used together in the organic solvent, the front surface drying properties (condition (2)) in a case in which recording is performed in a high temperature and high humidity environment had a tendency to drop.

The invention is not limited to the embodiments described above, and various modifications thereof are possible. For example, the invention includes configurations which are the substantially the same as the configurations described in the embodiments (for example, configurations having the same function, method and results, or configurations having the same purpose and effect). In addition, the invention includes configurations in which non-essential parts of the configurations described in the embodiments are replaced. In addition, the invention includes configurations exhibiting the same operation and effect as the configurations described in the embodiments or configurations capable of achieving the same purpose. In addition, the invention includes configurations in which known techniques were added to the configurations described in the embodiments.

What is claimed is:

1. A nonaqueous ink composition for ink jet recording comprising:
   a compound represented by the General Formula (1) below; and
   at least one compound represented by the General Formula (2A) or the General Formula (2B) below,

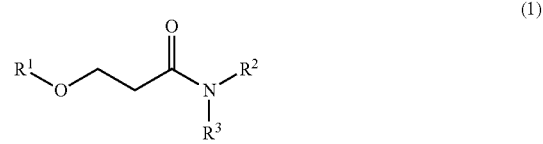

In the General Formula (1), $R^2$ represents an alkyl group having 1 to 4 carbon atoms, and $R^2$ and $R^3$ each independently represent a methyl group or an ethyl group,

In the General Formula (2A), $R^{4A}$ represents an alkyl group having 5 to 9 carbon atoms, and $R^{5A}$ represents a methyl group or an ethyl group,

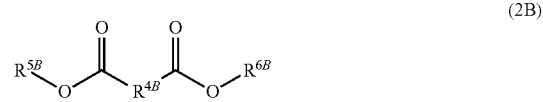

in the General Formula (2B), $R^{4B}$ represents an alkylene group having 2 to 5 carbon atoms, and $R^{5B}$ and $R^{6B}$ each independently represent alkyl groups having 1 to 4 carbon atoms.

2. The nonaqueous ink composition for ink jet recording according to claim 1, wherein in the General Formula (1), $R^1$ is a methyl group.

3. The nonaqueous ink composition for ink jet recording according to claim 1,
wherein, a content of the compound represented by the General Formula (1) [M1(mass %)] is from 8 mass % to 48 mass %.

4. The nonaqueous ink composition for ink jet recording according to claim 1,
wherein, the content of the compound represented by the General Formula (2A) [M2A (mass %)] is from 8 mass % to 48 mass %.

5. The nonaqueous ink composition for ink jet recording according to claim 1,
wherein, a total (M1+M2A) of a content of the compound represented by the General Formula (1) [M1(mass %)] and a content of the compound represented by the General Formula (2A) [M2A (mass %)] is from 16 mass % to 56 mass %.

6. The nonaqueous ink composition for ink jet recording according to claim 1,
wherein, a content ratio (M1/M2A) between a content of the compound represented by the General Formula (1) [M1(mass %)] and a content of the compound represented by the General Formula (2A) [M2A (mass %)] is from 0.1 to 10.

7. The nonaqueous ink composition for ink jet recording according to claim 1,
wherein, a content of the compound represented by the General Formula (2B) [M2B (mass %)] is from 8 mass % to 48 mass %.

8. The nonaqueous ink composition for ink jet recording according to claim 1,
wherein, a total (M1+M2B) of a content of the compound represented by the General Formula (1) [M1(mass %)] and a content of the compound represented by the General Formula (2B) [M2B (mass %)] is from 16 mass % to 56 mass %.

9. The nonaqueous ink composition for ink jet recording according to claim 1,
wherein, a content ratio (M1/M2B) between a content of the compound represented by the General Formula (1) [M1 (mass %)] and a content of the compound represented by the General Formula (2B) [M2B (mass %)] is from 0.1 to 10.

10. The nonaqueous ink composition for ink jet recording according to claim 1 further comprising an alkylene glycol compound.

11. The nonaqueous ink composition for ink jet recording according to claim 1 further comprising a pigment.

12. An ink jet recording method comprising:
discharging drops of the nonaqueous ink composition for ink jet recording according to claim 1; and
recording an image by adhering the drops to a recording surface containing a vinyl chloride-based resin.

* * * * *